(12) United States Patent
Wada et al.

(10) Patent No.: US 11,509,826 B2
(45) Date of Patent: Nov. 22, 2022

(54) IMAGING DEVICE, IMAGING METHOD, AND PROGRAM

(71) Applicant: FUJIFILM Corporation, Tokyo (JP)

(72) Inventors: Tetsu Wada, Saitama (JP); Kenkichi Hayashi, Saitama (JP); Koichi Tanaka, Saitama (JP); Yukinori Nishiyama, Saitama (JP); Tetsuya Fujikawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 57 days.

(21) Appl. No.: 17/187,191

(22) Filed: Feb. 26, 2021

(65) Prior Publication Data

US 2021/0185228 A1 Jun. 17, 2021

Related U.S. Application Data

(63) Continuation of application No. PCT/JP2019/031326, filed on Aug. 8, 2019.

(30) Foreign Application Priority Data

Sep. 26, 2018 (JP) .............................. JP2018-179969

(51) Int. Cl.
*G11B 27/00* (2006.01)
*G11B 27/34* (2006.01)
(Continued)

(52) U.S. Cl.
CPC ......... *H04N 5/23245* (2013.01); *G11B 27/34* (2013.01)

(58) Field of Classification Search
USPC ........ 386/278, 283, 290, 326, 329, 239, 248
See application file for complete search history.

(56) References Cited

U.S. PATENT DOCUMENTS

| 7,659,927 B2 * | 2/2010 | Aizawa | H04N 5/772 348/231.2 |
| 8,942,546 B2 * | 1/2015 | Kato | H04N 21/4828 386/346 |

FOREIGN PATENT DOCUMENTS

| JP | 2005-260393 A | 9/2005 |
| JP | 2006-93956 A | 4/2006 |

(Continued)

OTHER PUBLICATIONS

International Preliminary Report on Patentability and Written Opinion of the International Searching Authority for International Application No. PCT/JP2019/031326, dated Apr. 8, 2021, with an English translation.

(Continued)

*Primary Examiner* — Daquan Zhao
(74) *Attorney, Agent, or Firm* — Birch, Stewart, Kolasch & Birch, LLP

(57) ABSTRACT

An imaging device according to a first aspect of the present invention includes an imaging section that captures a video, a static image file generation section that extracts a first frame from a plurality of frames constituting the video and generates a static image file, a video file generation section that divides the video in accordance with the generation of the static image file to generate a plurality of video files, and a storage section that stores the static image file in association with a first video file that includes the first frame among the plurality of video files.

19 Claims, 13 Drawing Sheets

(51) Int. Cl.
*H04N 5/232* (2006.01)
*H04N 5/93* (2006.01)
*H04N 9/80* (2006.01)

(56) References Cited

FOREIGN PATENT DOCUMENTS

| JP | 2009-77026 A | 4/2009 |
| JP | 2016-32303 A | 3/2016 |

OTHER PUBLICATIONS

International Search Report for International Application No. PCT/JP2019/031326, dated Sep. 17, 2019, with an English translation.

* cited by examiner

IMAGING DEVICE, IMAGING METHOD, AND PROGRAM

CROSS-REFERENCE TO RELATED APPLICATIONS

This application is a Continuation of PCT International Application No. PCT/JP2019/031326 filed on Aug. 8, 2019, which claims priority under 35 U.S.C § 119(a) to Japanese Patent Application No. 2018-179969 filed on Sep. 26, 2018. Each of the above application(s) is hereby expressly incorporated by reference, in its entirety, into the present application.

BACKGROUND OF THE INVENTION

1. Field of the Invention

The present invention relates to an imaging device, an imaging method, and a non-transitory computer readable medium for storing a program that image a video, and particularly to an imaging device, an imaging method, and a non-transitory computer readable medium for storing a program that extract a frame constituting a video as a static image.

2. Description of the Related Art

There is known a technique of extracting a frame constituting a video as a static image. For example, JP2016-032303A describes that marking is performed on a video at a static image acquisition timing in response to a user's instruction during imaging of the video and a marking point and video frames before and after the marking point are extracted and displayed after the video capturing ends, so that the user can select a timing for extracting the static image from the video to extract a video frame at the timing as a static image.

SUMMARY OF THE INVENTION

In order to achieve the object described above, an imaging device according to a first aspect of the present invention includes an imaging section that captures a video, a static image file generation section that extracts a first frame from a plurality of frames constituting the video and generates a static image file, a video file generation section that divides the video in accordance with the generation of the static image file to generate a plurality of video files, and a storage section that stores the static image file in association with a first video file that includes the first frame among the plurality of video files.

According to the first aspect, the video is divided in accordance with the generation of the static image file to generate the plurality of video files and the static image file is stored in association with the first video file that includes the first frame among the plurality of video files. Therefore, it is possible to easily grasp a relationship between the video and the static image extracted from the frame of the video even though a recording time of the video is long. In the first aspect and each of the following aspects, it is preferable to divide the video with a frame acquired at a timing at which the static image file is generated, or a frame that is generated after the frame and is acquired near the timing at which the static image file is generated, as a head frame of the first video file.

In the imaging device according to a second aspect, according to the first aspect, the imaging section captures a video based on a first video capturing mode or a second video capturing mode that captures a video having a different capturing condition from the first video capturing mode. The video file generation section divides the video in accordance with the generation of the static image file to generate a plurality of video files in a case where the second video capturing mode is selected. In the second video capturing mode, the video is divided in accordance with the static image. Therefore, it is easy to refer to the frame in which the static image is extracted in the video file.

In the imaging device according to a third aspect, according to the second aspect, in the second video capturing mode, at least one of a shutter speed, a speed of autofocus, a tracking speed of automatic exposure, or a tracking speed of white balance is set faster than that of the first video capturing mode and/or a frame rate is set higher than that of the first video capturing mode. The third aspect specifically defines an example of a difference in the imaging conditions between the first and second video capturing modes in the second aspect.

In the imaging device according to a fourth aspect, according to any one of the first to third aspects, the static image file generation section generates the static image file in a RAW image format. The "RAW image" is an image in which the data output from the imaging element is digitally converted and recorded in a raw and uncompressed (or lossless compressed) state. The RAW image does not deteriorate in image quality due to compression, and an amount of image processing is small. Therefore, there is little effect on video processing.

In the imaging device according to a fifth aspect, according to any one of the first to fourth aspects, the video file generation section compresses the video in an MPEG format. The storage section stores the static image file in association with an I-frame of the first video file.

In the imaging device according to a sixth aspect, according to any one of the first to fifth aspects, the video file generation section generates the video file for each GOP constituted of an I-frame, a P-frame, and a B-frame. A group of pictures (GOP) includes at least the I-frame.

In the imaging device according to a seventh aspect, according to the sixth aspect, the video file generation section converts the static image file into image data in the same format as the I-frame and replaces the converted image data with the I-frame of the GOP corresponding to the first frame.

In the imaging device according to an eighth aspect, according to the seventh aspect, the video file generation section adds a difference between the I-frame before the replacement and the I-frame after the replacement to the P-frame and/or the B-frame constituting the GOP.

In the imaging device according to a ninth aspect, according to any one of the seventh or eighth aspect, the video file generation section processes the I-frame after the replacement based on movement information of the P-frame and/or the B-frame constituting the GOP to generate a P-frame and/or a B-frame, and replaces the P-frame and/or the B-frame constituting the GOP with the generated P-frame and/or B-frame. In a case where the P-frame and/or the B-frame are generated, a subject may be extracted from the I-frame after the replacement, and the subject may be moved (parallel movement, rotational movement), enlarged and/or reduced, or modified in accordance with a movement vector.

In the imaging device according to a tenth aspect, according to any one of the seventh to ninth aspects, a display control section that causes a display device to perform a playback display of the video file in a state where the replacement is executed is further provided. According to the tenth aspect, the user can view the video in the state where the replacement is performed.

In the imaging device according to an eleventh aspect, according to any one of the seventh to tenth aspects, a static image extraction section that extracts the frame constituting the video file in a state where the replacement is executed, as a static image is further provided. According to the eleventh aspect, it is possible to extract the static image from the video in the state where the replacement is performed. The timing of extracting the static image may be the same as or different from a timing of recording the static image during the video capturing.

In the imaging device according to a twelfth aspect, according to the eleventh aspect, the static image extraction section causes a display device to display static image extracting frames corresponding to the first frame among the plurality of frames constituting the video and extracts a frame selected from the displayed static image extracting frames as the static image. The user can extract a frame at a desired timing as the static image. Temporally preceding and/or following frames of the frame corresponding to the first frame may be further displayed.

In the imaging device according to a thirteenth aspect, according to any one of the first to twelfth aspects, the video file generation section divides the video with the first frame as a head frame.

In the imaging device according to a fourteenth aspect, according to any one of the first to thirteenth aspects, the video file generation section inserts the static image file between two video files and connects the video file and the static image file without generating a video file of the first frame. According to the fourteenth aspect, it is possible to reduce the load caused by simultaneously processing the video and the static image.

In the imaging device according to a fifteenth aspect, according to any one of the first to fourteenth aspects, the storage section stores the first video file and the static image file with the same file name. According to the fifteenth aspect, a correspondence between the video file and the static image file is clear, and thus it is possible to easily grasp a relationship between the files. Filename extensions may be different between the video file and the static image file.

In the imaging device according to a sixteenth aspect, according to any one of the first to fifteenth aspects, the static image file generation section generates the static image file in response to a static image generation instruction from a user. According to the sixteenth aspect, the user can record a static image at a desired timing.

In the imaging device according to a seventeenth aspect, according to any one of the first to sixteenth aspects, an event detection section that detects an event from the plurality of frames constituting the video is further included. The static image file generation section generates the static image file according to the detection of the event. In the seventeenth aspect, the static image is recorded according to the detection of the event. Therefore, it is suitable for long-time imaging, unmanned imaging, and the like.

In order to achieve the object described above, an imaging method according to an eighteenth aspect of the present invention includes an imaging step of capturing a video, a static image file generation step of extracting a first frame from a plurality of frames constituting the video and generating a static image file, a video file generation step of dividing the video in accordance with the generation of the static image file to generate a plurality of video files, and a storing step of storing the static image file in association with a first video file that includes the first frame among the plurality of video files. According to the eighteenth aspect, similar to the first aspect, it is possible to easily grasp a relationship between the video and the static image extracted from the frame of the video even though a recording time of the video is long. In the eighteenth aspect and each of the following aspects, it is preferable to divide the video with a frame acquired at a timing at which the static image file is generated, or a frame that is generated after the frame and is acquired near the timing at which the static image file is generated, as a head frame of the first video file.

In the imaging method according to a nineteenth aspect, according to the eighteenth aspect, in the imaging step, a video is captured based on a first video capturing mode or a second video capturing mode that captures a video having a different capturing condition from the first video capturing mode. In the video file generation step, in a case where the second video capturing mode is selected, the video is divided in accordance with the generation of the static image file to generate a plurality of video files.

In the imaging method according to a twentieth aspect, according to the nineteenth aspect, in the second video capturing mode, at least one of a shutter speed, a speed of autofocus, a tracking speed of automatic exposure, or a tracking speed of white balance is set faster than that of the first video capturing mode and/or a frame rate is set higher than that of the first video capturing mode.

In the imaging method according to a twenty-first aspect, according to any one of the eighteenth to twentieth aspects, in the static image file generation step, the static image file is generated in a RAW image format.

In the imaging method according to a twenty-second aspect, according to any one of the eighteenth to twenty-first aspects, in the video file generation step, the video is compressed in an MPEG format. In the storing step, the static image file is stored in association with an I-frame of the first video file.

In order to achieve the object described above, a non-transitory computer readable medium for storing a program according to a twenty-third aspect of the present invention causes an imaging device to execute the imaging method according to any one of the eighteenth to twenty-second aspects. A non-transitory recording medium recording a computer readable code of the program can also be mentioned as an aspect of the present invention.

As described above, with the imaging device, the imaging method, and the program according to the present invention, it is possible to easily grasp the relationship between the video and the static image extracted from the frame of the video.

DESCRIPTION OF THE PREFERRED EMBODIMENTS

Hereinafter, embodiments for implementing an imaging device, an imaging method, and a program according to the present invention will be described in detail with reference to accompanying drawings.

First Embodiment

<Overall Configuration of Imaging Device>

Figure 1:
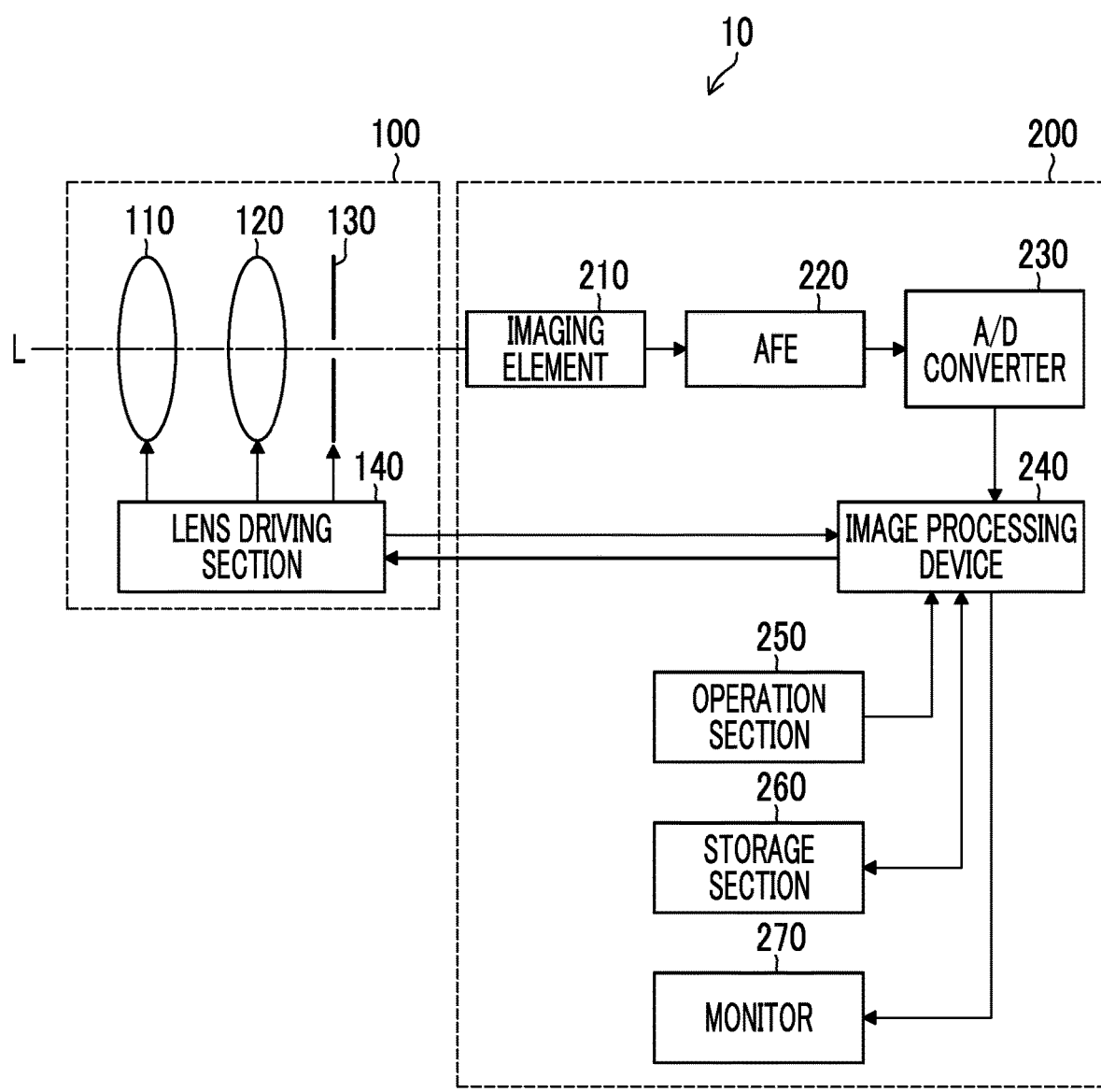
FIG. 1 is a diagram showing a configuration of a camera system according to a first embodiment.

FIG. 1 is a diagram showing a configuration of a camera system 10 (imaging device) according to a first embodiment. The camera system 10 is constituted of an interchangeable lens 100 (imaging section and imaging device) and an imaging device body 200 (imaging device), and forms a subject image (optical image) on an imaging element 210 with an imaging lens including a zoom lens 110 described below. The interchangeable lens 100 and the imaging device body 200 can be attached and detached through a mount (not shown).

<Configuration of Interchangeable Lens>

The interchangeable lens 100 comprises a zoom lens 110, a focus lens 120, a stop 130, and a lens driving section 140. The lens driving section 140 drives the zoom lens 110 and the focus lens 120 forward and backward according to a command from an image processing device 240 (lens driving control section 240G in FIG. 2) to perform zoom (optical zoom) adjustment and focus adjustment. The zoom adjustment and the focus adjustment may be performed according to a zoom operation and a focus operation (moving rotationally with a zoom ring and a focus ring (not shown) or the like) performed by a user, in addition to the command from the image processing device 240. The lens driving section 140 controls the stop 130 according to the command from the image processing device 240 to adjust exposure. On the other hand, information such as positions of the zoom lens 110 and the focus lens 120 and an opening degree of the stop 130 is input to the image processing device 240. The interchangeable lens 100 has an optical axis L1.

<Configuration of Imaging Device Body>

The imaging device body 200 comprises the imaging element 210 (imaging section), an AFE 220 (analog front end: AFE, imaging section), an A/D converter 230 (analog to digital: A/D, imaging section), and the image processing device 240. The imaging device body 200 may have a shutter (not shown) for blocking light transmitted through the imaging element 210. The imaging element 210 comprises a light receiving surface in which a large number of light receiving elements are arranged in a matrix. Subject light transmitted through the zoom lens 110, the focus lens 120, and the stop 130 is image-formed on the light receiving surface of the imaging element 210 and is converted into an electric signal by each light receiving element. A color filter of R (red), G (green), or B (blue) is provided on the light receiving surface of the imaging element 210, and a color image of a subject can be acquired based on a signal of each color. Various photoelectric conversion elements such as a complementary metal-oxide semiconductor (CMOS) and a charge-coupled device (CCD) can be used as the imaging element 210. The AFE 220 performs noise removal, amplification, and the like of an analog image signal output from the imaging element 210, and the A/D converter 230 converts the captured analog image signal into a digital image signal with a gradation width.

<Configuration of Image Processing Device>

Figure 2:
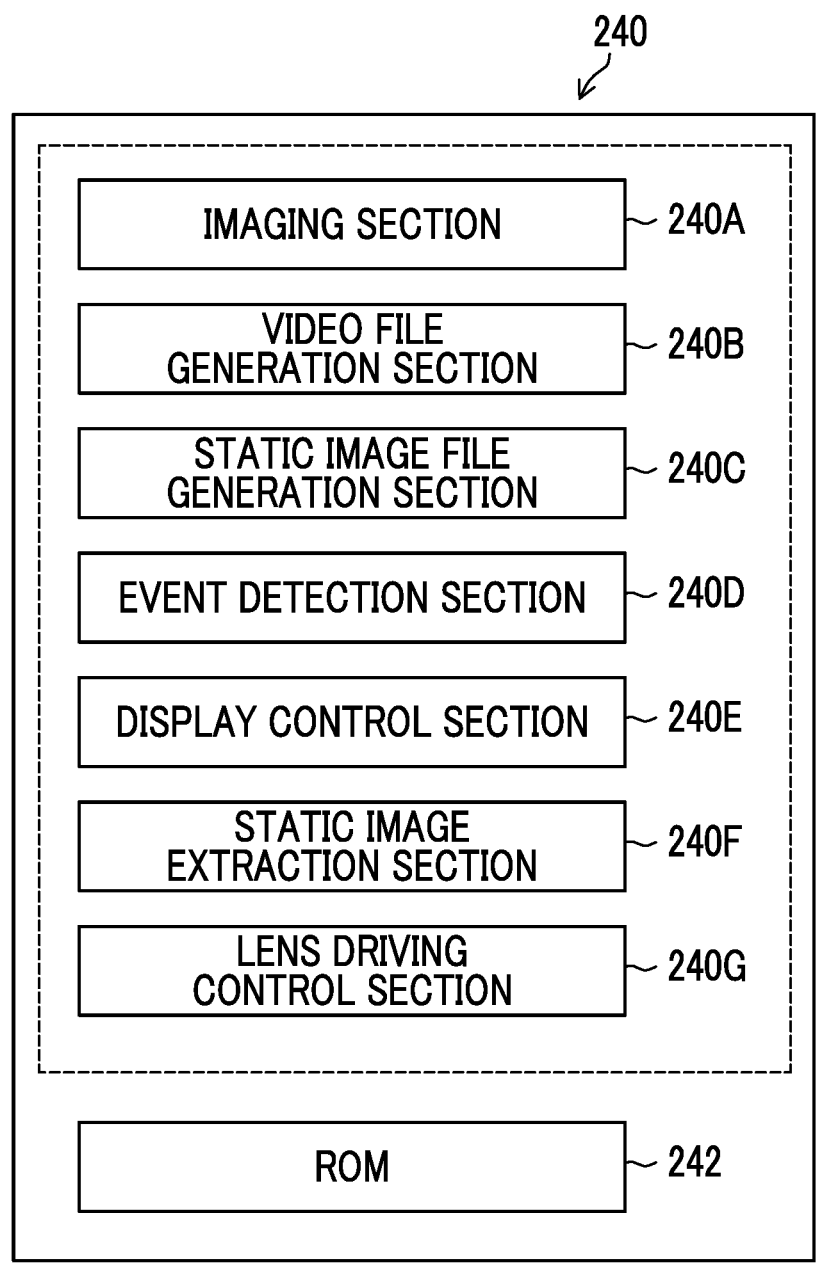
FIG. 2 is a diagram showing a functional configuration of an image processing device.

FIG. 2 is a diagram showing a functional configuration of the image processing device 240. The image processing device 240 comprises an imaging section 240A (imaging section), a video file generation section 240B (video file generation section), a static image file generation section 240C (static image file generation section), an event detection section 240D (event detection section), a display control section 240E (display control section), a static image extraction section 240F (static image extraction section), and a lens driving control section 240G (lens driving control section). The image processing device 240 performs processing such as imaging and file generation of a video, static image file generation, processing for a plurality of frames constituting a video, and extraction of a static image, based on the digital image signal input from the A/D converter 230. The processing by the image processing device 240 will be described below in detail.

Functions of the image processing device 240 can be realized by using various processors. The various processors include, for example, a central processing unit (CPU), which is a general-purpose processor that executes software (program) to realize various functions. The various processors described above also include a graphics processing unit (GPU) which is a processor specialized in image processing and a programmable logic device (PLD) which is a processor whose circuit configuration can be changed after manufacturing such as a field programmable gate array (FPGA). Further, the various processors described above also include a dedicated circuitry, which is a processor having a circuit configuration specifically designed to execute specific processing such as an application specific integrated circuit (ASIC), and the like.

The function of each section may be realized by one processor, or a plurality of processors of the same type or different types (for example, a plurality of FPGAs, a combination of CPU and FPGA, or a combination of CPU and GPU). A plurality of functions may be realized by one processor. As an example of configuring the plurality of functions by one processor, firstly, there is a form in which one processor is constituted of a combination of one or more CPUs and software and the processor realizes the plurality of functions, as represented by a computer such as an image processing device body or a server. Secondly, there is a form in which a processor that realizes functions of the entire system by one integrated circuit (IC) chip is used, as represented by a system on chip (SoC). As described above, a hardware structure for the various functions is constituted of using one or more of the various processors described above. Further, the hardware structure of the various processors is, more specifically, circuitry in which circuit elements such as semiconductor elements are combined. The circuitry may be circuitry that realize the functions described above by using logical sum, logical product, logical negation, exclusive logical sum, and logical operation combining the above.

In a case where the above processor or circuitry executes the software (program), a processor (computer) readable code of the executing software is stored in a non-transitory recording medium such as a read only memory (ROM) and the processor refers to the software. The software stored in the non-transitory recording medium includes a program for executing the imaging method according to the present invention. The code may be recorded in various magneto-optical storages and a non-transitory recording medium such as a semiconductor memory instead of the ROM. In a case where processing using the software is performed, for example, a random access memory (RAM) may be used as a transitory storage region or data stored in an electronically erasable and programmable read only memory (EEPROM) (not shown) may be referred to.

The image processing device 240 comprises a ROM 242 (read only memory: ROM, non-transitory recording medium) in addition to each section described above. The ROM 242 records computer readable codes of programs (including the program for executing the imaging method according to the present invention) necessary for imaging, recording, display, and the like of an image.

<Operation Section>

The operation section 250 has a release button, an operation button (for example, a cross button, a Quick button, an OK button, or the like), a dial, a switch, and the like (all are not shown), and the user can perform various operations such as an imaging mode setting, a video capturing instruction, and a static image extraction instruction. A monitor 270 (touch panel type) may be used as the operation section 250.

<Storage Section>

A storage section 260 is constituted of various magneto-optical recording media, a non-transitory recording medium such as a semiconductor memory, and a control circuit thereof, and stores the video, the static image, the static image extracted from the video, and the like. A recording medium type capable of being attached to and detached from the imaging device body 200 can be used.

<Monitor and View Finder>

The monitor 270 (display device) is constituted of a touch panel type liquid crystal display panel and can display the video, the static image, static image extracting frames, and the like. The monitor 270 can be disposed on a back surface side, a top surface side, or the like of the imaging device body 200. The camera system 10 may include a view finder. The view finder is constituted of, for example, a liquid crystal display panel, a prism, a lens, and the like, and the user can visually recognize the video, the static image, the static image extracting frames, and the like through an eyepiece section (not shown). An "optical view finder (OVF)", an "electronic view finder (EVF)", or a "hybrid view finder (HVF)" which is a combination of these can be used as the view finder.

<Imaging Mode of Camera System>

The camera system 10 can set any one of a static image imaging mode, a normal video capturing mode (first video capturing mode), or a static image extracting video capturing mode (second video capturing mode) as an imaging mode. The static image imaging mode and the normal video capturing mode are the same as those of a normal digital camera. In the static image extracting video capturing mode, a video having a different capturing condition from the normal video capturing mode (video having an imaging condition emphasizing the extraction of the static image rather than viewing the video itself) is imaged. Specifically, in the static image extracting video capturing mode, at least one of a shutter speed, a speed of autofocus, a tracking speed of automatic exposure, or a tracking speed of white balance is set faster than that of the normal video capturing mode and/or a frame rate is set higher than that of the normal video capturing mode. Resolution and the frame rate are set to the highest values (for example, 4,000×2,000 pixels, 30 frames/second) that can be set by the camera system 10, and a tone is also set on an assumption of the static image extraction. An upper limit of ISO sensitivity is also set higher than that of the normal video capturing mode.

For example, the shutter speed is set to a value corresponding to a frame rate of a video to be recorded in the normal video capturing mode (1/30 seconds in a case where the frame rate is 30 frames/second), but is set faster (for example, less than 1/30 seconds) than a frame interval in a static image extracting video mode. In the normal video capturing mode, the shutter speed is set to the value corresponding to the frame rate of the video such that a smooth video is played back. However, a moving subject may be blurred in this case. Therefore, the shutter speed is set higher than that of the normal video capturing mode (higher than the frame interval) in the static image extracting video capturing mode, and thus it is possible to extract a high-quality static image with less blurring of the subject. Similarly, it is possible to increase the shutter speed by increasing the upper limit of ISO sensitivity, and thus it is possible to extract a static image with less blurring. It is possible to acquire many frames focused on the subject, many frames with appropriate exposure, and the like by setting the speed of autofocus, the tracking speed of automatic exposure, the tracking speed of auto white balance, or the like faster than that of the normal video capturing mode. The frame interval of the video is shorter by setting the frame rate to the high rate, and thus the number of frames that can be extracted as the static image increases.

With the static image extracting video capturing mode described above, it is possible to store the video and extract the frame constituting the video as the static image. Therefore, the user can easily image a photograph of an event (natural phenomenon, accident, happening, or the like) that does not know when it occurs, a photograph of a momentary state of a subject whose state changes with the passage of time or a moving subject, and the like. In this case, it is possible to extract the static image not only at the timing at which the recording of the static image is instructed but also at another timing as described below in detail. Therefore, the user can acquire the static image at a desired timing. With the setting of the imaging conditions (shutter speed, resolution, frame rate, and the like described above) suitable for the static image extraction, it is possible to extract a high-quality static image.

<Storing of Video and Static Image>

Figure 3:
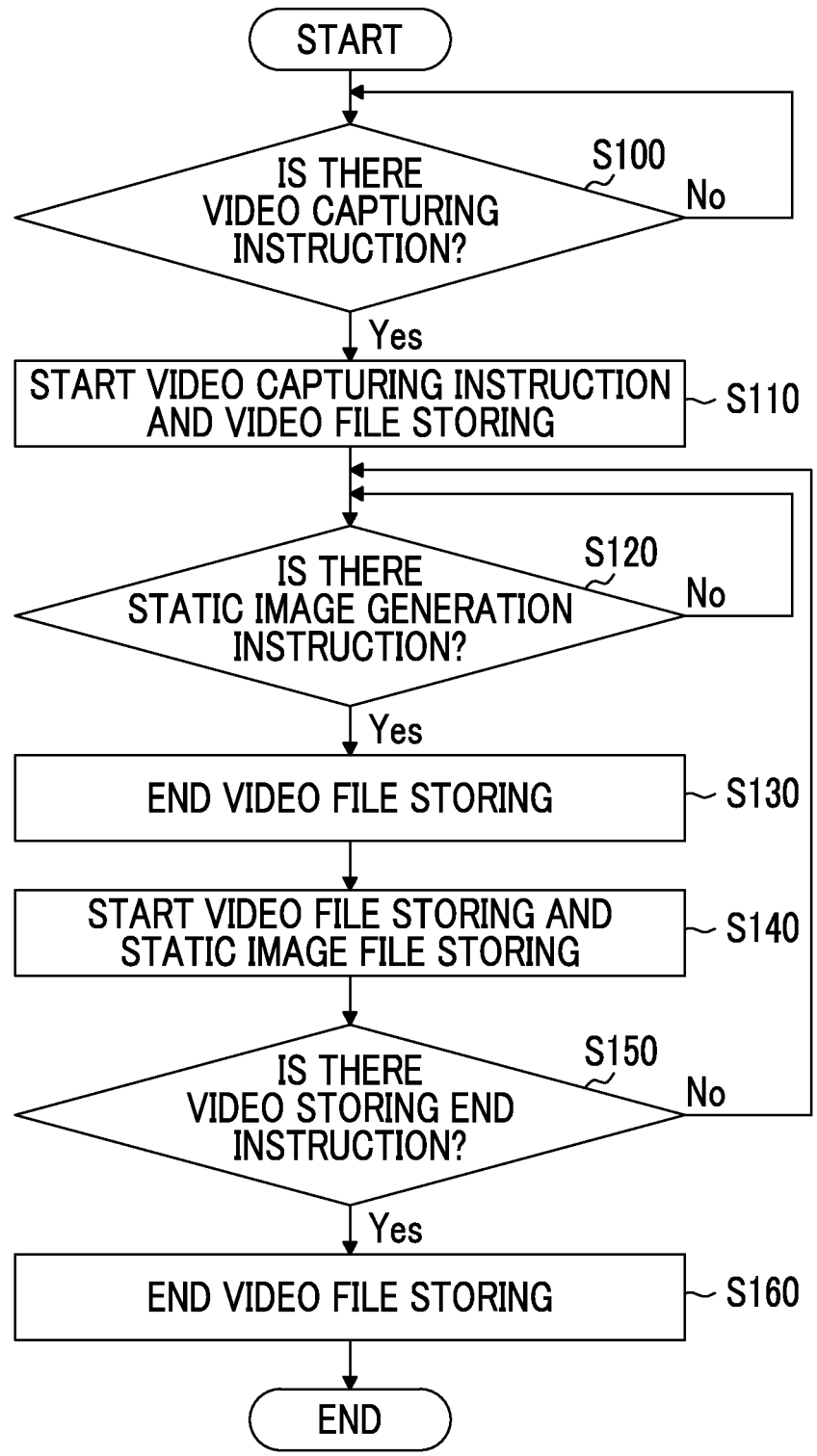
FIG. 3 is a flowchart showing recording processing of a video and a static image.

The imaging method in the camera system 10 having the above configuration will be described. FIG. 3 is a flowchart showing processing in the static image extracting video capturing mode. For example, in a case where the camera system 10 is set to the static image extracting video capturing mode by operating a mode dial (not shown) of the operation section 250, the processing of FIG. 3 is started.

<Video Recording Instruction>

The imaging section 240A and the video file generation section 240B determine whether or not the video capturing instruction is issued (Step S100: imaging step, video file generation step). For example, in a case where the release button (not shown) of the operation section 250 is pressed down, it can be determined that "video capturing instruction is issued". In a case where the determination is affirmative, the processing proceeds to Step S110.

<Imaging and Compression Recording of Video>

In Step S110, the imaging section 240A starts the imaging of the video (imaging step), and the video file generation section 240B compresses the imaged video and starts storing the compressed video as a new video file (video file generation step). The recording and the storing may be performed together with a voice by a microphone (not shown) provided in the camera system 10. The video can be compressed in an MPEG format (MPEG2, MPEG4, or the like). In this case, the frame of the video is divided into an I-frame, a P-frame, and a B-frame. A group of pictures (GOP) is formed by at least the I-frame among the frames. The I-frame is a frame that holds all information of the frame, and the P-frame is a frame that can express only a difference unless a preceding I-frame is referred to. The B-frame is a frame that can express only a difference unless preceding and following I-frame, P-frame, and B-frame are referred to.

<Static Image Generation Instruction>

The static image file generation section 240C determines whether or not a static image generation instruction (generation instruction of static image file) is issued (Step S120: static image file generation step). The determination of the static image generation instruction can be made in a GOP unit in response to the user's instruction or according to the detection of the event. In a case where the determination is made in the GOP unit, it can be determined that "static image generation instruction is issued" every time a new GOP is recorded, for example. In a case where the determination is made according to the user's instruction, it can be determined that the "static image generation instruction is issued by user's instruction" in the case where the release button (not shown) of the operation section 250 is pressed or in a case where an operation through the monitor 270 is performed, for example. In a case where determination is made according to the event detection, it can be determined that "static image generation instruction is issued" in a case where the event detection section 240D detects a specific subject such as a face of a person from the frame constituting the video or in a case where a movement or brightness change of the subject is detected. A movement of the camera system 10 may be detected by a gyro or an acceleration sensor, and occurrence of an event (and the static image generation instruction according to the event detection) may be determined based on the detection result.

In a case where the static image generation instruction is determined in the GOP unit, the high-quality static image can be acquired periodically. Therefore, it is the best option from a viewpoint of image quality in a case where a capacity of the recording medium or an increase in power consumption due to static image processing is acceptable. In the case where the determination is made according to the user's instruction, the static image is recorded according to the user intention. Therefore, the user can easily search the image in the case of the static image extraction and the like. With the determination in the GOP unit only in a specific case (for example, in a case where the release button is continuously pressed), it is possible to minimize the influence on the capacity or the increase in the power consumption. In the case where the determination is made according to the event detection, the static image can be automatically generated, which is suitable for long-time imaging or unattended imaging.

<Division of Video>

In a case where the static image generation instruction is issued, the video file generation section 240B temporarily ends the storing of the video file (Step S130: video file generation step). A file is newly generated for each divided video in accordance with the generation of the static image file to divide the video with a frame (first frame) of the video corresponding to the static image file as a head frame (refer to FIG. 4 described below). In division of the video, a frame that is acquired after the frame corresponding to the static image file and that is acquired near a timing at which the static image file is generated may be the head frame of the new video file. An I-frame that is acquired after the frame corresponding to the static image file and that is closest to the timing at which the static image file is generated may be the head frame of the video file. In a case where the video is compressed in the MPEG format, the video file may be generated in the GOP unit.

Figure 4:
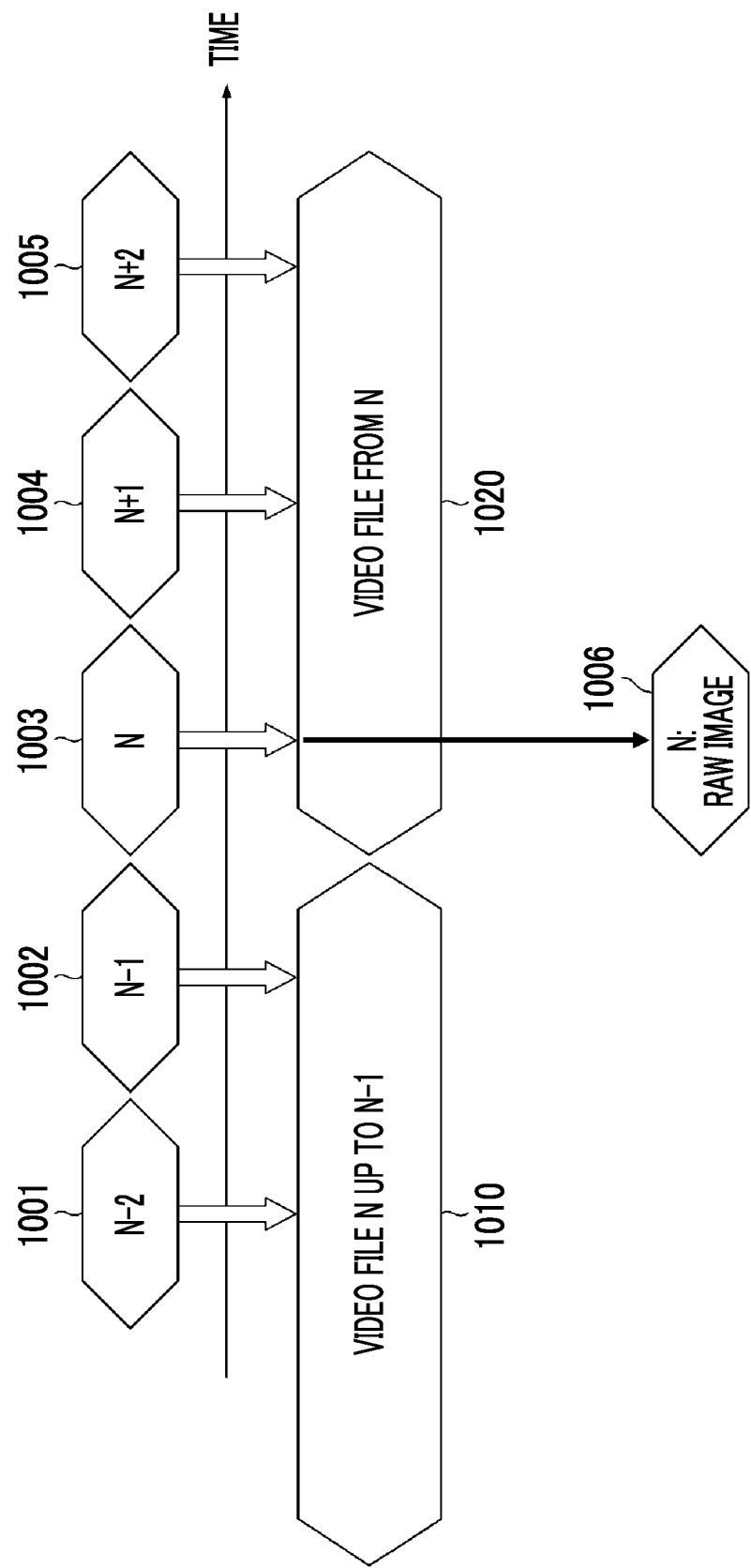
FIG. 4 is a conceptual diagram showing a state of recording a video and a static image.

FIG. 4 is a diagram showing a state of division recording of the video. In a case where the generation timing of the static image is a timing of the frame 1003 (frame number N) in a situation where the frames of the video are continuous such as frames 1001, 1002, 1003, 1004, 1005, . . . (frame numbers are N−2, N−1, N, N+1, . . . ), the video file generation section 240B ends recording of a video file 1010 up to the frame 1002 (frame number N−1) to divide the video, compresses the frames from frame number N as a new video file 1020 (first video file), and stores the new video file 1020. That is, the frame 1003 (frame number N; first frame) is the head frame of the new video file 1020 to be divided, and the new video file 1020 (first video file) includes the frame 1003 (frame number N; first frame). On the other hand, the static image file generation section 240C extracts the frame 1003 (frame number N; first frame) from the plurality of frames constituting the video and generates a static image file 1006 (described below). In this aspect, the video is divided every time the static image file is generated, and thus a plurality of divided video files are generated. The storage section stores the plurality of generated video files and a plurality of static image files (a plurality of first frames) in association with each other by a method described below.

A division method of the video includes a method of dividing the video into a general format with an added header or footer and a method of dividing the video at a frame break in a video format on an assumption of continuous playback before and after the division. In the former method, only the divided video file can be read and played. Therefore, it is possible to start the playback at a high speed. It is possible to perform the playback even though a video file other than a necessary video file is deleted. On the other hand, the latter method does not require the header or footer processing and thus can be handled in the same real-time processing as continuous video recording.

<Recording of High-Quality Static Image>

The static image file generation section 240C generates a static image file having the high-quality static image compared with the frame (for example, the frame 1003) constituting the video within a time shorter than a time required to generate and store one video file (the video file of the divided video; video file 1020). With such a static image recording processing, it is possible to store the high-quality static image that takes a longer time than one frame of a video to generate and store the static image and has a high processing load. Examples of the "high-quality static image" include an image with a high resolution and an image with a lower compression ratio than the video (zero may be used), but are not limited to the examples. The static image file generation section 240C may generate the static image file 1006 in a RAW image format. The "RAW image" is an image in which the data output from the imaging element is digitally converted and recorded in a raw and uncompressed (or lossless compressed) state. It is not necessary to perform filter processing required for color interpolation or enhancement, and a recording cycle is long. Therefore, the influence on video processing by the recording of the RAW image is small. The RAW image may be recorded for each GOP (for example, at a start of the GOP). The static image file generation section 240C may perform static image processing (so-called "development processing" or the like) on the static image file 1006. The static image file generation section 240C may perform color correction processing (white balance correction or the like) different from the video file generation section 240B in the static image processing. For example, it is possible to perform the color correction processing based on a color correction setting for static image set in advance by the user.

The "high-quality static image" such as the RAW image described above can be used to improve the image quality of the static image extracted from the video, as described below in detail.

<Association Between Static Image File and Video File>

The static image file generation section 240C stores the static image file 1006 (static image file for high-quality static image) in association with the video file 1020 (first video file) (Step S140: storing step). In a case where the video is compressed and stored in the MPEG format, the static image file 1006 may be stored in association with the head I-frame (frame 1003) of the GOP. Examples of an association method include (1) association by file name, (2) association by timestamp, (3) association by recording file name in header, and (4) association by describing header description ID number in header. Information indicating a position of an I-frame that is in the frames constituting the video file (first video file) and is acquired at a timing closest to a storing timing of the static image file (static image file for high-quality static image based on the first frame) may be stored in association with the static image file by the method described above. This facilitates the frame extraction from the video. In a case of (1) association by file name, the video file generation section 240B can perform the recording by assigning a file name including a continuous number indicating a time-series order (for example, (imaging date+continuous number), but not limited thereto) to the video file of the divided video, and the static image file generation section 240C can perform the recording by making a file name of the static image file same as a file name of the video file to be associated. In this case, a filename extension may be changed (for example, ".mpg" and ".raw"). In a case of the association, a series of divided videos and a static image stored during imaging of the video may be stored in the same folder.

With the association described above, the user can easily grasp a relationship between the video and the static image extracted from the frame of the video.

The imaging section 240A, the video file generation section 240B, and the static image file generation section 240C (and the event detection section 240D in a case where a static image recording instruction is issued according to the event detection) repeat the processing from Step S120 to Step S140 until a video recording end instruction is issued (until YES in Step S150). For example, the determination in Step S150 can be affirmed in the case where the release button (not shown) of the operation section 250 is pressed.

In a case where the determination in Step S150 is affirmative, the imaging section 240A and the video file generation section 240B end the imaging of the video and the storing of the video file (Step S160).

<Video Synthesis Processing>

Figure 5:
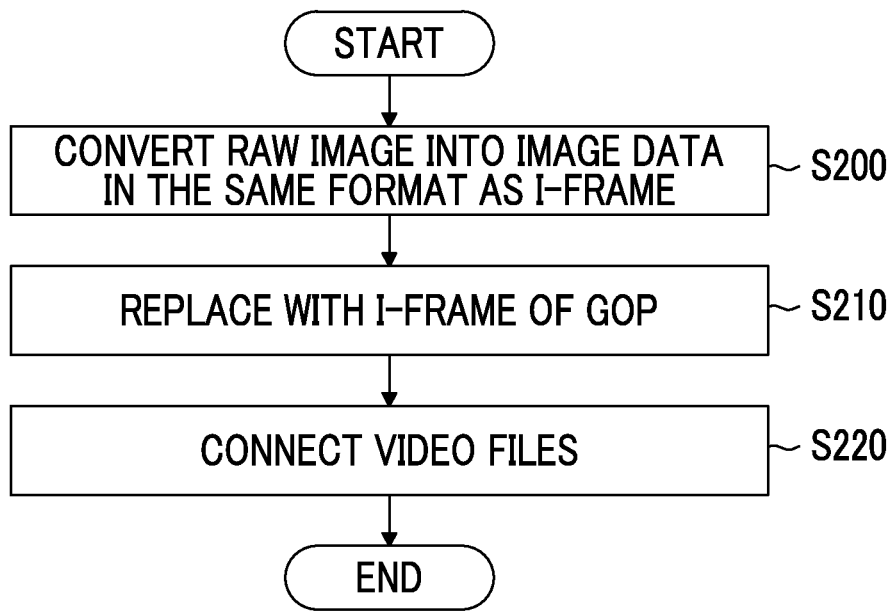
FIG. 5 is a flowchart showing video synthesis processing.

Synthesis processing the video stored by the storing processing of the video and the static image described above will be described. FIG. 5 is a flowchart showing the synthesis processing of the video. The video file generation section 240B performs the static image processing (so-called "development processing" or the like) on the static image file 1006 (high-quality static image) such as the RAW image recorded in Step S140 to convert the static image file 1006 into image data in the same format as the I-frame (Step S200: static image conversion step, video synthesis step) and replaces the converted static image with the corresponding I-frame (frame 1003) of the GOP (Step S210: first replacement step, video synthesis step). The video file generation section 240B connects and stores the divided and recorded video files (after replacement of I-frame) in the time-series order.

Figure 6:
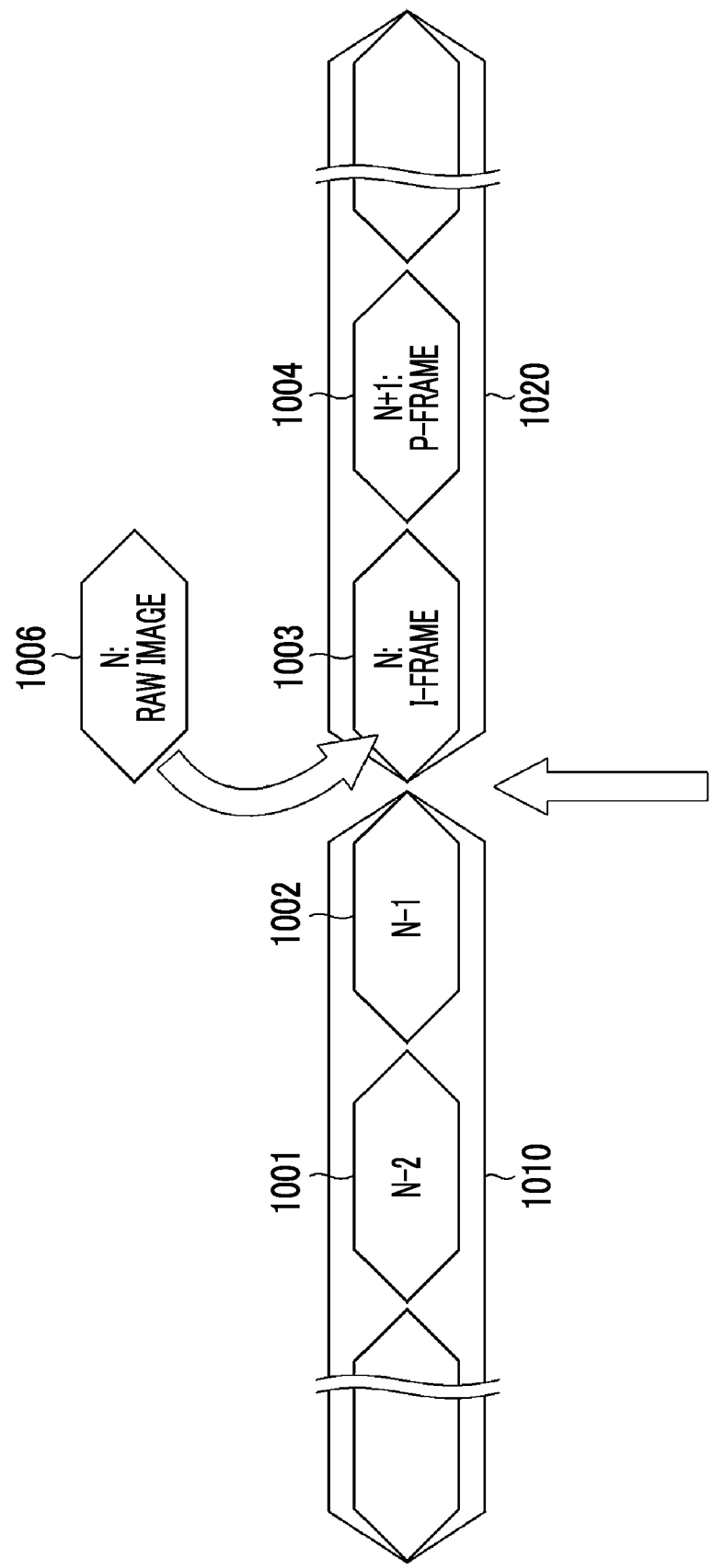
FIG. 6 is a conceptual diagram showing a state of video synthesis processing.

For example, in a case where there is the video file 1010 constituted of frames up to frame number N−1 and the video file 1020 constituted of frames starting from frame number N as shown in FIG. 6, the video file generation section 240B converts the RAW image (static image file 1006) stored at the storing timing of frame number N into the same format as the I-frame, replaces the converted image with the I-frame (frame 1003; head of GOP) of frame number N, and connects the video file 1010 and the video file 1020 after the replacement. The video file generation section 240B can perform the replacement and the connection based on the association information (file name, header, footer, timestamp, and the like).

With the processing described above, it is possible to improve the image quality of an I-frame portion of the video by the replacement of the I-frame. In a case where the subject is in focus and moves little, it is possible to improve the image quality of a P-frame portion and a B-frame portion through the I-frame. The display control section 240E can perform a playback display of the video in a state where the replacement and the connection are executed on the monitor 270 (display device), and thus the user can view the video with high image quality.

<Other Aspects of Video Synthesis Processing>

Figure 7:
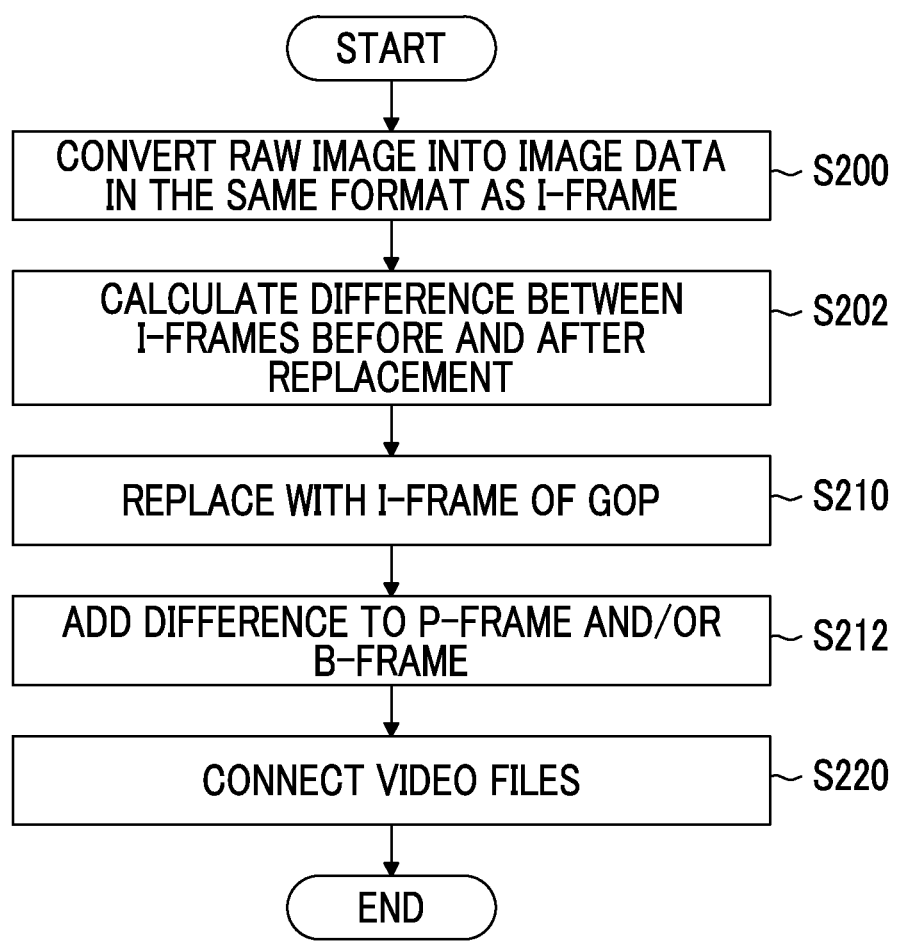
FIG. 7 is another flowchart showing the video synthesis processing.

FIG. 7 is a flowchart showing another aspect of the video synthesis processing. The same step number is assigned to the step that performs the same processing as in FIG. 5, and detailed description thereof is omitted. Following Step S200, the video file generation section 240B calculates a difference between the I-frame before the replacement and the I-frame after the replacement (Step S202: difference calculation step, video synthesis step) and adds the calculated difference to the P-frame and/or the B-frame constituting the GOP (depending on the configuration of GOP) (Step S212: difference addition step, video synthesis step). After the addition, the video files are connected as in the case of FIG. 5. According to such an aspect, it is possible to reduce a correction error caused by a difference in resolution between the high-quality static image (the image recorded in Step S140 and converted into the I-frame for replacement) and the I-frame before the replacement, based on a difference in a moving part for the subject having a slight movement.

Figure 8:
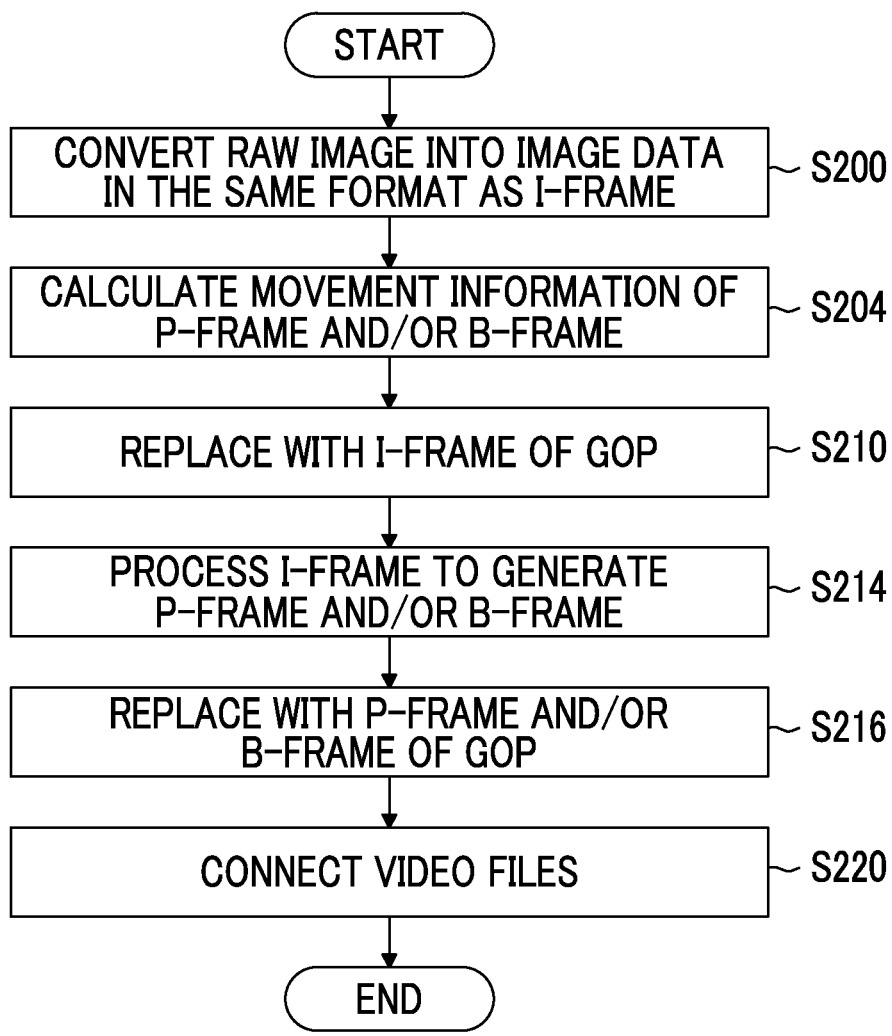
FIG. 8 is still another flowchart showing the video synthesis processing.
Figure 9A:
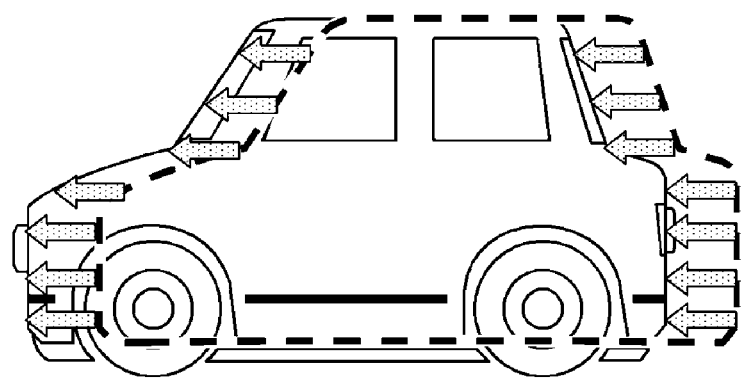
FIGS. 9A and 9B are diagrams showing a state of performing processing according to a movement of a subject.
Figure 9B:
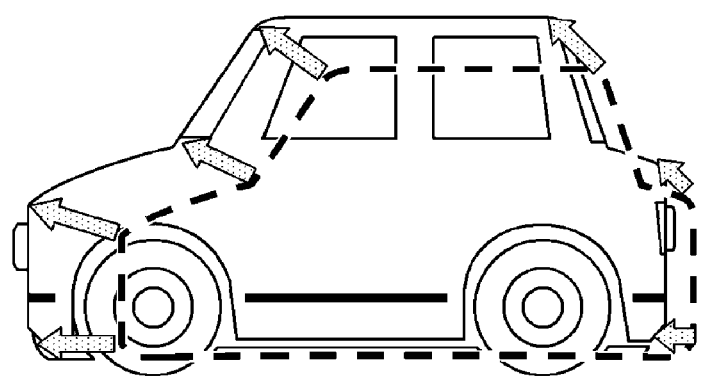

FIG. 8 is a flowchart showing still another aspect of the video synthesis processing. The same step number is assigned to the step that performs the same processing as in FIGS. 5 and 7, and detailed description thereof is omitted. The video file generation section 240B calculates movement information (for example, movement vector) of the P-frame and/or the B-frame (Step S204: movement information calculation step, video synthesis step) and processes the I-frame after the replacement based on the movement information to generate the P-frame and/or the B-frame (Step S214: image generation step, video synthesis step). In Step S214, for example, in a case where determination is made based on the calculated movement information (movement vector) that "a plurality of adjacent macroblocks move in the same or almost the same direction (movement vectors are the same or almost the same)", the video file generation section 240B extracts the subject from the I-frame after the replacement (frame corresponding to the high-quality static image), and moves, enlarges or reduces, modifies, or the like the subject in accordance with the movement vector. FIG. 9A is a diagram showing a state where the subject is moved in accordance with the same movement vector, and FIG. 9B is a diagram showing a state where the subject is moved and modified. Dotted lines in FIGS. 9A and 9B indicate the subject before the movement, the modification, or the like, and arrows indicate the movement vectors in each part. The video file generation section 240B replaces the P-frame and/or the B-frame constituting the GOP (depending on configuration of GOP) with the P-frame and/or the B-frame generated by the process (Step S216: second replacement step, video synthesis step). According to such an aspect, in a case where the movement of the subject is large, it is possible to improve the image quality of moving P-frame and/or B-frame with the process of the I-frame whose image quality is improved by the replacement.

<Another Aspect of Video File Connection>

Figure 10:
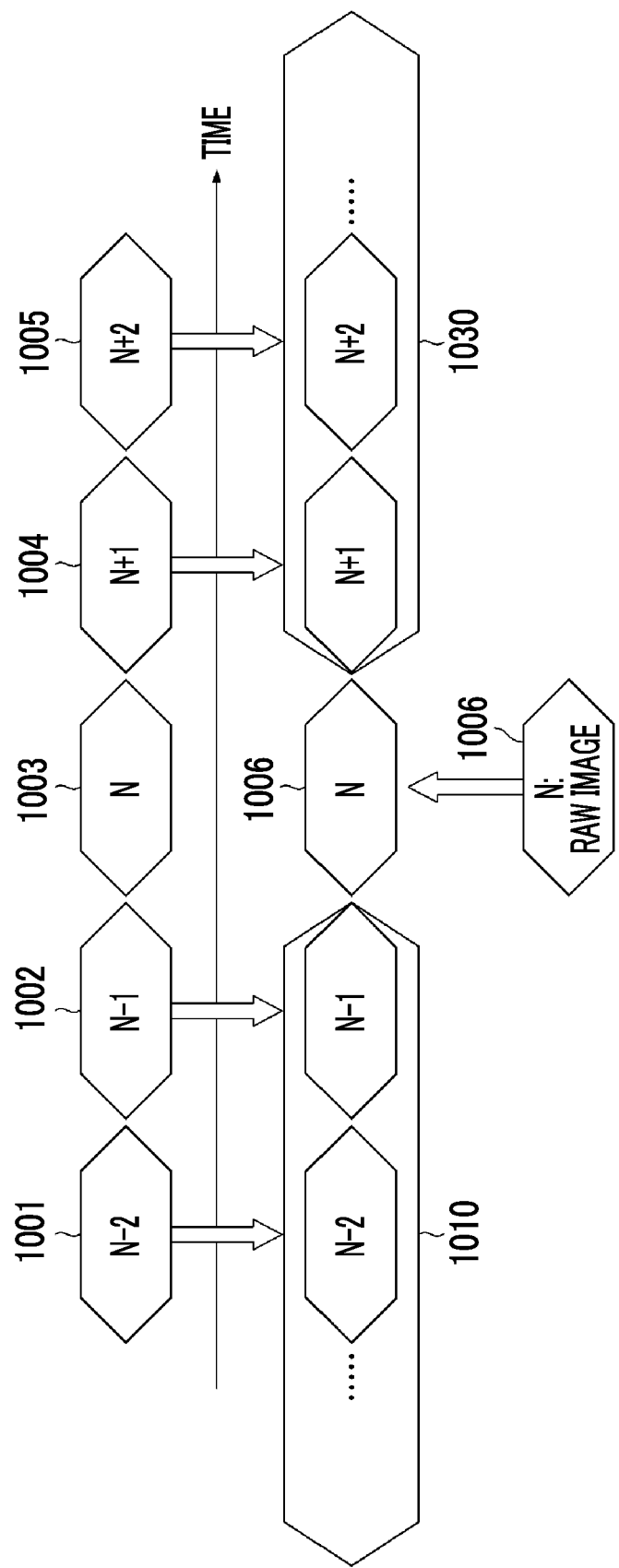
FIG. 10 is a conceptual diagram showing a state where a static image file is inserted between video files and is connected with the video files.

For connection of the video files, the aspect in which the video files are connected and recorded in the time-series order has been described (refer to FIGS. 5 and 6). However, the video files can be connected by another aspect. For example, as shown in FIG. 10, the video file generation section 240B may not record the video frame at the timing of recording the static image file 1006 (frame number N in the example of FIG. 10) and may insert the static image file 1006 between two video files of the divided video (the video file 1010 up to frame number N−1 and the video file 1030 starting from frame number N+1) to connect the video files 1010 and 1030 and the static image file 1006.

<Extraction of Static Image>

As described below, it is possible to extract the frame constituting the video as the static image in the camera system 10.

<Display of Static Image Extracting Frames>

Figure 11:
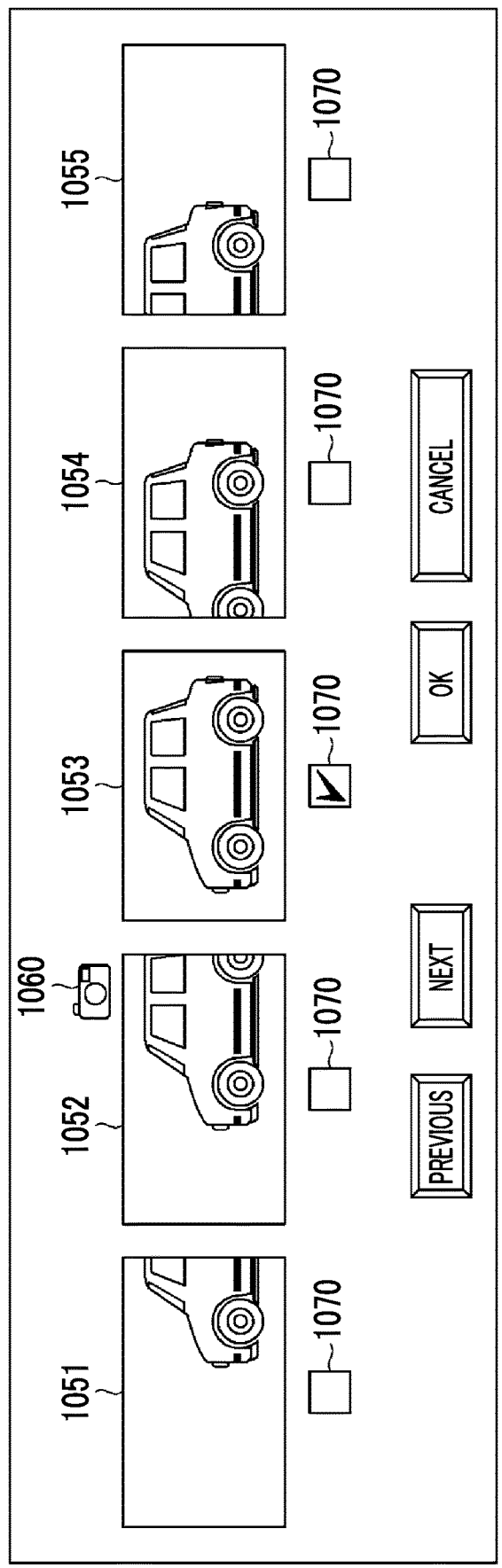
FIG. 11 is a diagram showing a state where static image extracting frames are displayed.

Specifically, the static image extraction section 240F causes the display device to display the static image extracting frames including a frame corresponding to the stored static image file among the frames constituting the video. For example, in a case where the high-quality static image is stored corresponding to frame number N of the video as shown in FIG. 4, the static image extraction section 240F causes the monitor 270 (display device) to display frames including the frame with frame number N among the frames constituting the video whose image quality is improved by the processing (replacement of I-frame, P-frame, B-frame, and the like), as the static image extracting frame. FIG. 11 is an example of such a display, and five frames 1051 to 1055 (frame numbers N−1 to N+3) including a frame 1052 with frame number N are displayed. The static image extraction section 240F assigns a camera-like icon 1060 to the frame 1052 (frame number N) in which the static image is recorded, and thus the user can grasp that the frame 1052 is a frame in which the static image is recorded.

A range of the static image extracting frames to be displayed may include the temporally preceding frame (frame 1051) and the temporally following frames (frames 1053 to 1055) of "frame corresponding to the recorded static image file" (frame 1052 with frame number N in the example of FIG. 11). Alternatively, there may be an aspect of "including only temporally preceding frame" or "including only temporally following frame". The range of the static image extracting frames to be displayed may be set according to designation by the user or may be set without depending on the designation by the user. The range of the frame to be displayed may be defined by time (for example, one second before and after the frame in which the static image is recorded) or by the number of frames (for example, preceding and following 10 frames each of the frame in which the static image is recorded). Only the frames recorded as the static images may be displayed in a list of frames in an initial state, and temporally preceding and/or following frames of the frame selected from the frames may be displayed. With the display of only the frames recorded as the static images in the initial state on the display control section 240E and the determination of the frame to be displayed of the video file from the selected frame, it is possible to reduce the processing load in a case where the video file compressed between frames is displayed on the monitor 270 (display device).

<Selection of Frame to be Extracted>

The user can select a frame from the displayed static image extracting frames. In the example of FIG. 11, the user can select a frame by checking a check box 1070 for a desired frame through the operation section 250 and/or the monitor 270, and can also select a plurality of frames. The frame in which the static image is recorded is not necessarily recorded at the best timing, and the user may want to select another frame. Therefore, it is preferable to be able to select from preceding and/or following frames of the frame in which the static image is recorded, in addition to the frame in which the static image is recorded. FIG. 11 shows a state where the user selects the frame 1053 different from the frame in which the static image is recorded (frame 1052 with the icon 1060).

<Extraction of Static Image>

The static image extraction section 240F extracts a frame selected from the static image extracting frames displayed on the monitor 270 as the static image. The video file is stored in a video format such as the MPEG format. Therefore, the static image extraction section 240F converts data of the selected frame into a static image format (JPEG format or the like). The user can extract a high-quality static image at a desired timing from the video whose image quality is improved by the video synthesis processing.

Second Embodiment

Although the camera system 10 which is a digital camera is described in the first embodiment, the configuration of the imaging device is not limited thereto. Another imaging device according to the present invention may be, for example, a built-in type or external type camera for PC, or a portable terminal device having an imaging function as described below.

Examples of the portable terminal device which is an embodiment of the imaging device according to the present invention include a portable phone or smartphone, a personal digital assistant (PDA), and a portable game machine.

Hereinafter, a smartphone will be described as an example in detail with reference to drawings.

Figure 12:
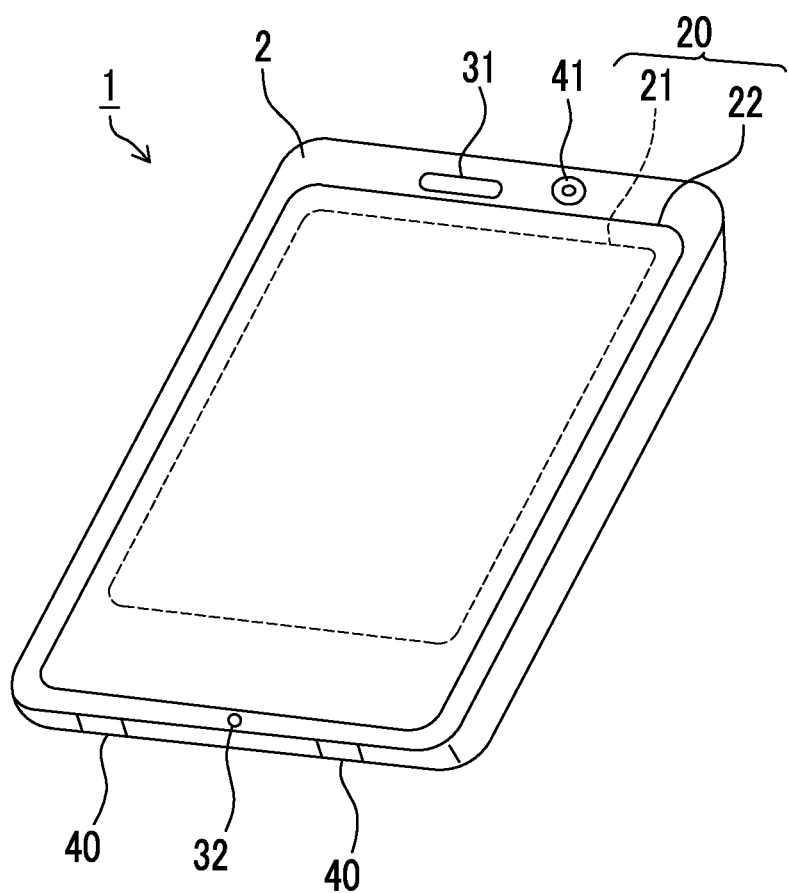
FIG. 12 is an external view of a smartphone according to a second embodiment.

FIG. 12 shows an appearance of a smartphone 1 (imaging device) which is an embodiment of the imaging device according to the present invention. The smartphone 1 shown in FIG. 12 has a flat housing 2 and comprises a display and input section 20 in which a display panel 21 (display device) as a display section and an operation panel 22 (operation section) as an input section are integrated on one surface of the housing 2. The housing 2 comprises a speaker 31, a microphone 32, an operation section 40 (operation section), and a camera section 41 (imaging device, imaging section, video file generation section, static image file generation section, event detection section, display control section, static image extraction section, and lens driving control section). A configuration of the housing 2 is not limited thereto. For example, a configuration in which the display section and the input section are independent may be employed, or a configuration having a folding structure or a slide mechanism may be employed.

Figure 13:
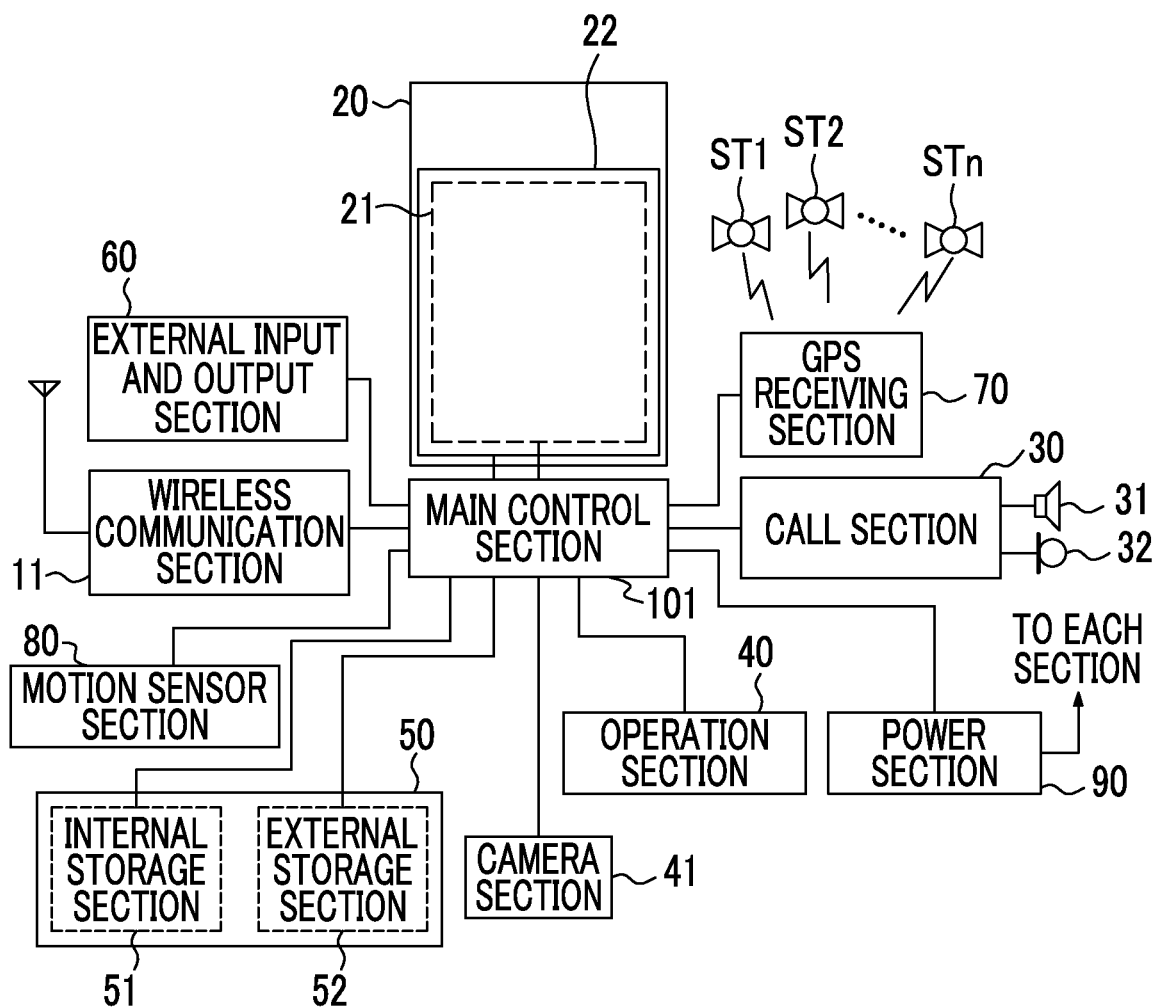
FIG. 13 is a block diagram showing a configuration of the smartphone according to the second embodiment.

FIG. 13 is a block diagram showing a configuration of the smartphone 1 shown in FIG. 12. As shown in FIG. 13, a wireless communication section 11, a display and input section 20, a call section 30, an operation section 40, a camera section 41, a storage section 50, an external input and output section 60, a GPS receiving section 70 (global positioning system: GPS), a motion sensor section 80, a power section 90, and a main control section 101 (imaging section, video file generation section, static image file generation section, event detection section, display control section, static image extraction section, and lens driving control section) are provided as main components of the smartphone 1. A wireless communication function for performing mobile wireless communication through a base station device and a mobile communication network is provided as a main function of the smartphone 1.

The wireless communication section 11 performs wireless communication with the base station device accommodated in the mobile communication network in response to an instruction from the main control section 101. Using such wireless communication, various pieces of file data such as voice data and image data, e-mail data, and the like are transmitted and received, and Web data, streaming data, and the like are received.

The display and input section 20 is a so-called touch panel in which an image (static image and/or video image), character information, or the like is displayed to visually transmit information to the user and a user operation on the displayed information is detected under control of the main control section 101, and comprises the display panel 21 and the operation panel 22.

The display panel 21 uses a liquid crystal display (LCD), an organic electro-luminescence display (OLED), or the like as the display device. The operation panel 22 is a device that is placed such that an image displayed on a display surface of the display panel 21 is visually recognizable and detects one or a plurality of coordinates operated by a finger or a stylus of the user. In a case where such a device is operated by the finger or the stylus of the user, a detection signal generated due to the operation is output to the main control section 101. Next, the main control section 101 detects an operation position (coordinates) on the display panel 21 based on the received detection signal.

As shown in FIG. 12, although the display panel 21 and the operation panel 22 of the smartphone 1 exemplified as an embodiment of the imaging device according to the present invention integrally constitute the display and input section 20, the operation panel 22 is disposed so as to completely cover the display panel 21. In a case where such a disposition is employed, the operation panel 22 may comprise a function of detecting the user operation even in a region outside the display panel 21. In other words, the operation panel 22 may comprise a detection region (hereinafter referred to as display region) for an overlapping portion that overlaps the display panel 21 and a detection region (hereinafter referred to as non-display region) for the other outer edge portion that does not overlap the display panel 21.

A size of the display region and a size of the display panel 21 may be perfectly matched, but the sizes are not necessarily matched. The operation panel 22 may comprise two sensitive regions of the outer edge portion and the other inner portion. Further, a width of the outer edge portion is designed as appropriate according to a size of the housing 2 or the like. Furthermore, examples of a position detection method employed in the operation panel 22 include a matrix switch method, a resistive film method, a surface acoustic wave method, an infrared method, an electromagnetic induction method, and an electrostatic capacitive method, and any method may be employed.

The call section 30 comprises the speaker 31 and the microphone 32. The call section 30 can convert a voice of the user input through the microphone 32 into voice data that can be processed by the main control section 101 and output the converted voice data to the main control section 101, and can decode the voice data received by the wireless communication section 11 or the external input and output section 60 and output the decoded voice data from the speaker 31. As shown in FIG. 12, it is possible to mount the speaker 31 on the same surface as a surface on which the display and input section 20 is provided, and to mount the microphone 32 on a side surface of the housing 2, for example.

The operation section 40 is a hardware key using a key switch or the like and receives the instruction from the user. For example, as shown in FIG. 12, the operation section 40 is a push button type switch that is mounted on the side surface of the housing 2 of the smartphone 1, is turned on in a case of being pressed with a finger or the like, and is turned off by restoring force of a spring or the like in a case where the finger is released.

The storage section 50 stores a control program or control data of the main control section 101, application software, address data in which a name, a telephone number, and the like of a communication partner are associated, data of transmitted and received e-mails, Web data downloaded by Web browsing, or downloaded content data, and temporarily stores streaming data or the like. The storage section 50 is constituted of an internal storage section 51 built into the smartphone and an external storage section 52 having an attachable and detachable external memory slot. Each of the internal storage section 51 and the external storage section 52 constituting the storage section 50 is formed by using a storing medium such as a flash memory type, a hard disk type, a multimedia card micro type, a card type memory (for example, MicroSD (registered trademark) memory or the like), a random access memory (RAM), or a read only memory (ROM).

The external input and output section 60 serves as an interface with all external devices connected to the smartphone 1, and is for directly or indirectly connecting to another external device by communication or the like (for example, universal serial bus (USB), IEEE1394, or the like) or a network (for example, Internet, wireless LAN, Bluetooth (registered trademark), radio frequency identification (RFID), infrared communication (infrared data association:

IrDA) (registered trademark), ultra wideband (UWB) (registered trademark), ZigBee (registered trademark), or the like).

Examples of the external device connected to the smartphone 1 include a wired/wireless headset, a wired/wireless external charger, a wired/wireless data port, a memory card (SIM) or a subscriber identity module (SIM)/user identity module (UIM) card connected through a card socket, external audio and video devices connected through audio and video input and output (I/O) terminals, wirelessly connected external audio and video devices, a wired/wirelessly connected smartphone, a wired/wirelessly connected PDA, a wired/wirelessly connected personal computer, and an earphone. The external input and output section 60 can transmit the data transmitted from such an external device to each component inside the smartphone 1 or can transmit the data inside the smartphone 1 to the external device.

The GPS receiving section 70 receives GPS signals transmitted from GPS satellites ST1 to STn in response to the instruction from the main control section 101 and executes positioning calculation processing based on the plurality of received GPS signals to detect a position of the smartphone 1 (latitude, longitude, and altitude). In a case where position information can be acquired from the wireless communication section 11 or the external input and output section 60 (for example, wireless LAN), the GPS receiving section 70 can detect the position thereof using the position information.

The motion sensor section 80 comprises, for example, a triaxial acceleration sensor and detects a physical movement of the smartphone 1 in response to the instruction from the main control section 101. With the detection of the physical movement of the smartphone 1, a moving direction or acceleration of the smartphone 1 is detected. Such a detection result is output to the main control section 101. The power section 90 supplies electric power accumulated in a battery (not shown) to each section of the smartphone 1 in response to the instruction from the main control section 101.

The main control section 101 comprises a microprocessor and operates according to the control program or the control data stored in the storage section 50 to integrally control each section of the smartphone 1 including the camera section 41. The main control section 101 has a mobile communication control function for controlling each section of a communication system and an application processing function for performing voice communication or data communication through the wireless communication section 11.

The application processing function is realized by the main control section 101 operating according to the application software stored in the storage section 50. Examples of the application processing function include an infrared communication function that controls the external input and output section 60 to perform the data communication with a counterpart device, an e-mail function that transmits and receives e-mails, and a Web browsing function that browses a Web page.

The main control section 101 also has an image processing function such as displaying a video on the display and input section 20 based on the image data (data of static image or video image) such as received data or downloaded streaming data. The image processing function means a function of the main control section 101 decoding the image data, performing the image processing on such a decoding result, and displaying an image on the display and input section 20.

Further, the main control section 101 executes display control for the display panel 21 and operation detection control for detecting the user operation through the operation section 40 and the operation panel 22. With the execution of the display control, the main control section 101 displays an icon for activating the application software, a software key such as a scroll bar, or a window for creating an e-mail. The scroll bar is a software key for receiving an instruction to move a display portion of an image, such as a large image that does not fit in the display region of the display panel 21.

With the execution of the operation detection control, the main control section 101 detects the user operation through the operation section 40, receives an operation for an icon or an input of a character string in an input field of a window through the operation panel 22, or receives a request for scrolling the display image through the scroll bar.

Further, with the execution of the operation detection control, the main control section 101 determines whether the operation position for the operation panel 22 is the overlapping portion (display region) that overlaps the display panel 21 or the other outer edge portion (non-display region) that does not overlap the display panel 21, and has a touch panel control function for controlling the sensitive region of the operation panel 22 or a display position of the software key.

The main control section 101 can also detect a gesture operation for the operation panel 22 and execute a preset function according to the detected gesture operation. The gesture operation does not mean a conventional simple touch operation, but means an operation of drawing a trajectory with a finger or the like, designating a plurality of positions at the same time, or a combination of these to draw the trajectory about at least one from the plurality of positions.

The camera section 41 is a digital camera (imaging device) that performs the imaging electronically using the imaging element such as a complementary metal oxide semiconductor (CMOS) or a charge-coupled device (CCD). The camera section 41 can convert the image data (video, static image) obtained by imaging into compressed image data such as MPEG or joint photographic coding experts group (JPEG), and record the compressed image data in the storage section 50 or output the compressed image data through the external input and output section 60 or the wireless communication section 11, under the control of the main control section 101. The camera section 41 can perform division and combination of the videos, acquisition of the high-quality static image (RAW images or the like), frame replacement and process, and extraction of the static image from the video, under the control of the main control section 101. In the smartphone 1 shown in FIG. 12, the camera section 41 is mounted on the same surface as the display and input section 20, but the mounting position of the camera section 41 is not limited thereto. The camera section 41 may be mounted on a back surface of the display and input section 20, or a plurality of camera sections 41 may be mounted. In a case where the plurality of camera sections 41 are mounted, the camera sections 41 to be used for imaging may be switched to perform imaging independently, or the plurality of camera sections 41 may be used at the same time for imaging.

The camera section 41 can be used for various functions of the smartphone 1. For example, it is possible to display the image acquired by the camera section 41 on the display panel 21 or use the image of the camera section 41 as one of operation inputs of the operation panel 22. In a case where the GPS receiving section 70 detects the position, it is possible to detect the position with reference to the image from the camera section 41. Further, it is possible to determine an optical axis direction of the camera section 41 of the smartphone 1 or a current use environment without using the triaxial acceleration sensor or in combination with the triaxial acceleration sensor with reference to the image from the camera section 41. Of course, it is possible to use the image from the camera section 41 in the application software. In addition, the image data of the static image or the video can be recorded in the storage section 50 by adding the position information acquired by the GPS receiving section 70, voice information acquired by the microphone 32 (the voice information may be converted into text information by voice-text conversion by the main control section or the like), posture information acquired by the motion sensor section 80, and the like, or can be output through the external input and output section 60 or the wireless communication section 11.

In the smartphone 1 having the configuration described above, the processing of the imaging method according to the present invention (imaging and recording of the video, recording of the static image, video synthesis, static image extraction, and the like) can be also performed similarly to the camera system 10 according to the first embodiment. Specifically, the processing executed by the image processing device 240 (each section shown in FIG. 2) in the first embodiment is executed by the camera section 41 and the main control section 101 in the smartphone 1, and thus it is possible to perform the processing of the imaging method according to the present invention. In addition, the functions of the operation section 250, the storage section 260, and the monitor 270 in the first embodiment can be respectively realized by the operation section 40, the storage section 50 and the operation panel 22, and the display panel 21 and the operation panel 22 in the smartphone 1. Accordingly, it is possible to obtain the same effect (capable of recording the high-quality static image during the video capturing, capable of dividing and recording the video, capable of easily grasping the relationship between the video for static image extraction and the static image recorded during the video capturing, capable of recording the high-quality static image with high processing load, capable of improving the image quality of the video, capable of connecting the video files, capable of extracting the frame at a desired timing as the static image by the user, and the like) as that of the camera system 10 according to the first embodiment also in the smartphone 1 according to the second embodiment.

EXPLANATION OF REFERENCES

1: smartphone
2: housing
10: camera system
11: wireless communication section
20: display input section
21: display panel
22: operation panel
30: call section
31: speaker
32: microphone
40: operation section
41: camera section
50: storage section
51: internal storage section
52: external storage section
60: external input and output section
70: GPS receiving section
80: motion sensor section
90: power section
100: interchangeable lens
101: main control section
110: zoom lens
120: focus lens
130: stop
140: lens driving section
200: imaging device body
210: imaging element
220: AFE
230: A/D converter
240: image processing device
240A: imaging section
240B: video file generation section
240C: static image file generation section
240D: event detection section
240E: display control section
240F: static image extraction section
240G: lens driving control section
242: ROM
250: operation section
260: storage section
270: monitor
1001: frame
1002: frame
1003: frame
1004: frame
1005: frame
1006: static image file
1010: video file
1020: video file
1030: video file
1051: frame
1052: frame
1053: frame
1054: frame
1055: frame
1060: icon
1070: check box
L1: optical axis
S100 to S220: each step of imaging method
ST1 to STn: GPS satellite

What is claimed is:

1. An imaging device comprising:
an imaging sensor that captures a video; and
a processor configured to
extract a first frame from a plurality of frames constituting the video in response to an image generation instruction;
generate an image file according to the first frame;
divide the video in accordance with the generation of the image file to generate a plurality of video files; and
store the image file in association with a first video file that includes the first frame among the plurality of video files,
wherein the processor is further configured to
control the imaging sensor to capture the video based on a first video capturing mode or a second video capturing mode that captures the video having a different capturing condition from the first video capturing mode, and
divide the video to generate the plurality of video files based on the image generation instruction in a case where the second video capturing mode is selected,
wherein, in the second video capturing mode, at least one of a shutter speed, a speed of autofocus, a tracking speed of automatic exposure, or a tracking speed of white balance is set faster than that of the first video capturing mode and/or a frame rate is set higher than that of the first video capturing mode.

2. The imaging device according to claim 1, wherein, the image file is a static image file.

3. The imaging device according to claim 2, wherein the processor is further configured to generate the static image file in a RAW image format.

4. The imaging device according to claim 2, wherein the processor is further configured to compress the video in an MPEG format and store the static image file in association with an I-frame of the first video file.

5. The imaging device according to claim 2, wherein the processor is further configured to generate the video file for each GOP constituted of an I-frame, a P-frame, and a B-frame.

6. The imaging device according to claim 5, wherein the processor is further configured to convert the static image file into image data in the same format as the I-frame and replace the converted image data with the I-frame of the GOP corresponding to the first frame.

7. The imaging device according to claim 6, wherein the processor is further configured to add a difference between the I-frame before the replacement and the I-frame after the replacement to the P-frame and/or the B-frame constituting the GOP.

8. The imaging device according to claim 6, wherein the processor is further configured to cause a display device to perform a playback display of the video file in a state where the replacement is executed.

9. The imaging device according to claim 6, wherein the processor is further configured to extract the frame constituting the video file in a state where the replacement is executed, as a static image.

10. The imaging device according to claim 9, wherein the processor is further configured to cause a display device to display static image extracting frames corresponding to the first frame among the plurality of frames constituting the video and extracts a frame selected from the displayed static image extracting frames as the static image.

11. The imaging device according to claim 1, wherein the processor is further configured to divide the video with the first frame as a head frame.

12. An imaging device comprising:
an imaging sensor that captures a video; and
a processor configured to
extract a first frame from a plurality of frames constituting the video in response to an image generation instruction;
generate an image file according to the first frame;
divide the video in accordance with the generation of the image file to generate a plurality of video files; and
store the image file in association with a first video file that includes the first frame among the plurality of video files,
wherein the processor is further configured to
control the imaging sensor to capture the video based on a first video capturing mode or a second video capturing mode that captures the video having a different capturing condition from the first video capturing mode, and
divide the video to generate the plurality of video files based on the image generation instruction in a case where the second video capturing mode is selected, wherein
the image file is a static image file, and
the processor is further configured to insert the static image file between two video files and connects the video file and the static image file without generating a video file of the first frame.

13. The imaging device according to claim 1, wherein the processor is further configured to store the first video file and the image file with the same file name.

14. The imaging device according to claim 1, wherein the processor is further configured to generate the image file in response to the image generation instruction from a user.

15. The imaging device according to claim 1 wherein the processor is further configure to detect an event from the plurality of frames constituting the video and generate the image file according to the detection of the event.

16. An imaging method comprising:
capturing a video;
extracting a first frame from a plurality of frames constituting the video in response to an image generation instruction;
generating an image file according to the first frame;
dividing the video in accordance with the generation of the image file to generate a plurality of video files; and
storing the image file in association with a first video file that includes the first frame among the plurality of video files,
wherein the video is captured based on a first video capturing mode or a second video capturing mode that captures a video having a different capturing condition from the first video capturing mode, and
the video is divided based on the image generation instruction to generate a plurality of video files in a case where the second video capturing mode is selected,
wherein, in the second video capturing mode, at least one of a shutter speed, a speed of autofocus, a tracking speed of automatic exposure, or a tracking speed of white balance is set faster than that of the first video capturing mode and/or a frame rate is set higher than that of the first video capturing mode.

17. The imaging method according to claim 16, wherein the image file is a static image file, and
wherein the static image file is generated in a RAW image format.

18. The imaging method according to claim 16, wherein the image file is a static image file, and
wherein the video is compressed in an MPEG format, and the static image file is stored in association with an I-frame of the first video file.

19. A non-transitory computer readable medium for storing a program causing an imaging device to execute the imaging method according to claim 16.

* * * * *